July 29, 1958     E. R. REYNOLDS     2,844,942
VALVE
Filed Feb. 12, 1957     3 Sheets-Sheet 1
Fig. 1
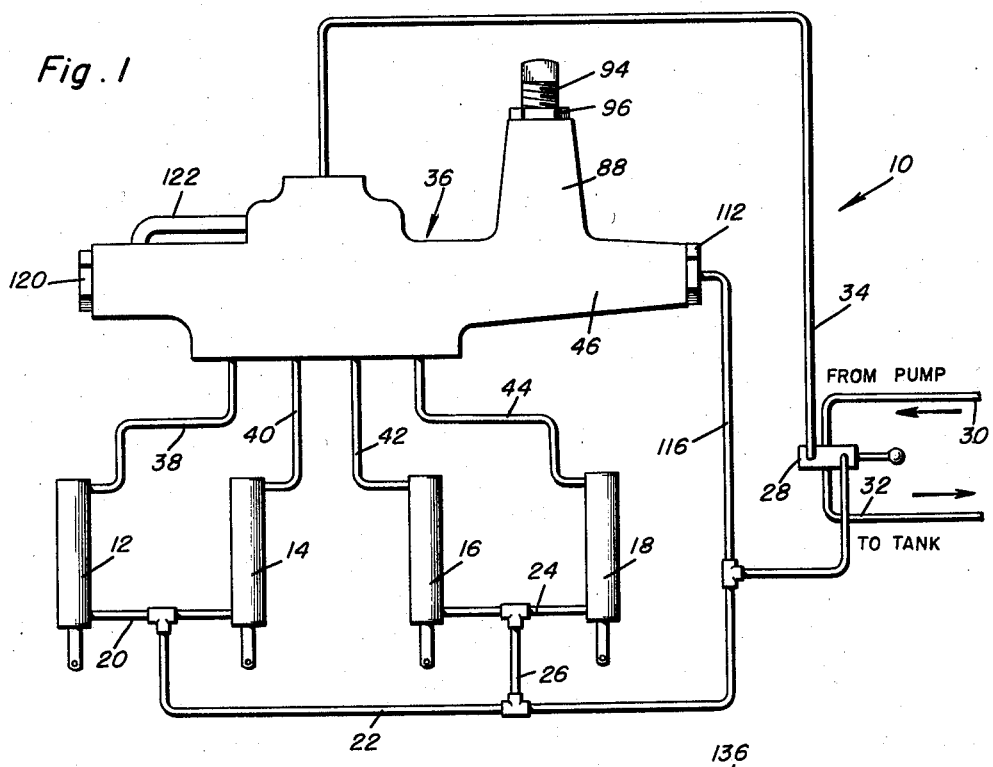
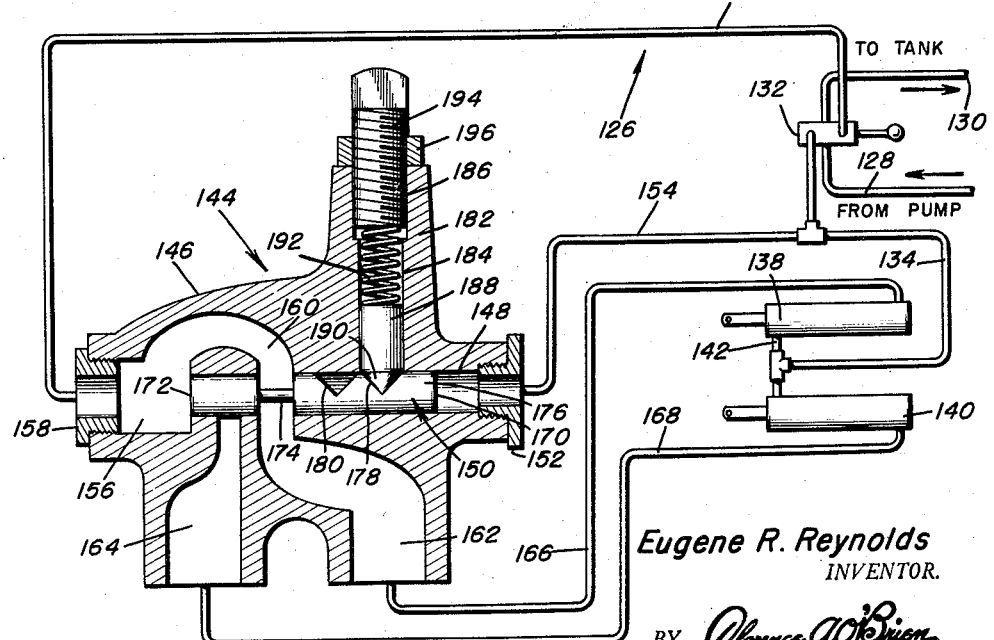
Fig. 5
Eugene R. Reynolds
INVENTOR.

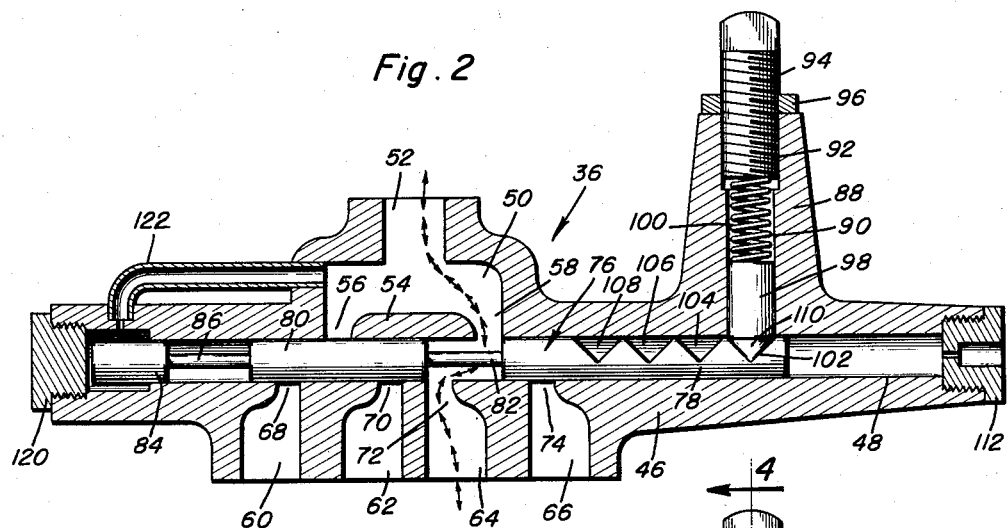
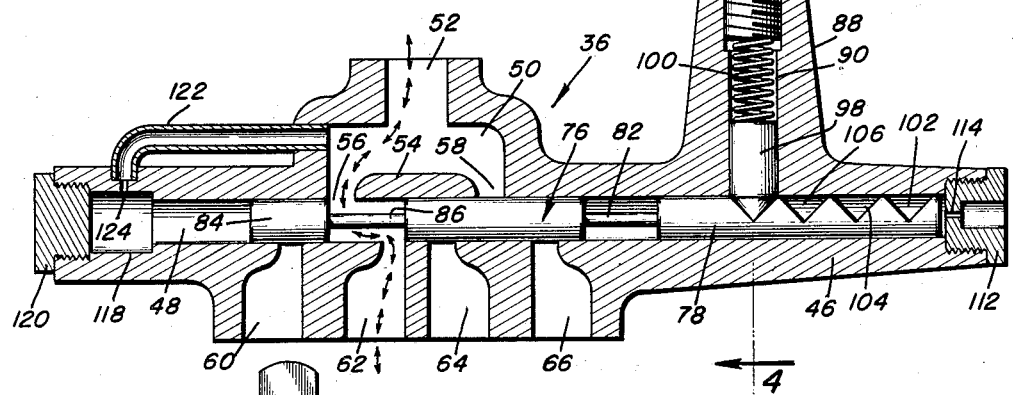
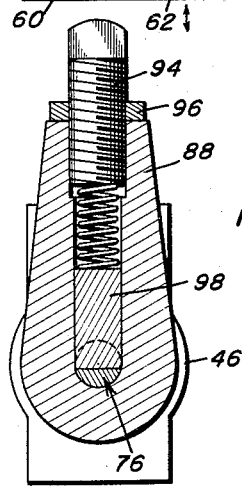

United States Patent Office 2,844,942
Patented July 29, 1958

2,844,942
VALVE
Eugene R. Reynolds, McAllen, Tex.
Application February 12, 1957, Serial No. 639,787
9 Claims. (Cl. 60—97)

This invention relates in general to new and useful improvements in valves and more specifically to an automatically actuated valve.

The primary object of this invention is to provide a valve which is so constructed whereby it may be mounted in a hydraulic system for controlling the operation of a plurality of hydraulic motors, the valve being so constructed whereby hydraulic motors connected thereto are progressively actuated.

Another object of this invention is to provide an improved hydraulic system which includes a plurality of hydraulic motors, the hydraulic motors being controlled by a control valve, the control valve being of such a nature whereby it is actuated by differential pressures in supply and return lines for the hydraulic motors, so that once one of the hydraulic motors has been actuated to its limits, the control valve will be shifted so as to move the next hydraulic motor in the same direction.

Another object of this invention is to provide an automatic valve for use in controlling farm machinery operated by a plurality of hydraulic motors, the valve being mounted in the hydraulic system of the farm machinery, with there being provided a four-way main control valve for controlling and reversing the direction of operation of the hydralulic motors, the control valve being of an automatic shifting type responsive to the build-up of pressures in the hydraulic lines and serving to progressively operate the hydraulic motors.

A further object of this invention is to provide a control valve for progressively supplying fluid to a plurality of hydraulic motors, the control valve being self-contained and including means for actuating the same in response to movement of a first hydraulic motor to a maximum position whereby fluid is supplied to a next hydraulic motor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a schematic view of a hydraulic system employing four hydraulic cylinders and shows mounted in the system a control valve conforming to the spirit of this invention;

Figure 2 is an enlarged, longitudinal vertical sectional view taken through the control valve of Figure 1 and shows the specific construction thereof, the valve member of the control valve being shown in an initial position;

Figure 3 is an enlarged sectional view similar to Figure 2 and shows the control member shifted to an end position;

Figure 4 is an enlarged, transverse sectional view taken substantially upon the plane indicated by the section line 4—4 of Figure 3 and shows the details of means for retaining the control member in a selected position;

Figure 5 is a schematic view of a modified form of hydraulic system employing only two hydraulic motors, the control valve thereof being shown on an enlarged scale and in section in order to fully illustrate the internal details of the construction thereof.

Figure 6:
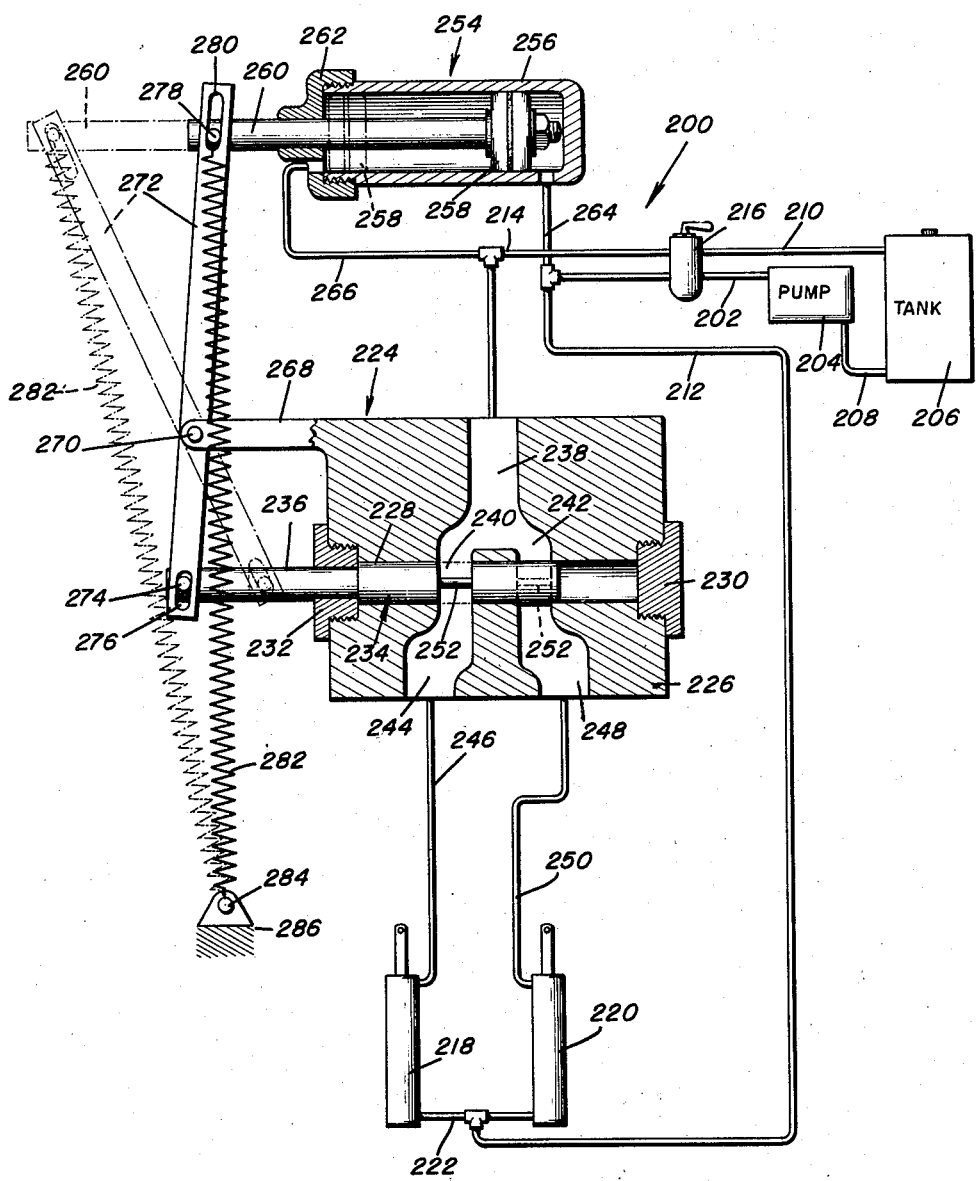
Figure 6 is a schematic view of a third hydraulic system employing a third type of control valve.

Referring now to the drawings in detail, it will be seen that there is illustrated in Figure 1 a hydraulic system which is referred to in general by the reference numeral 10. The hydraulic system 10 includes four hydraulic motors of the double acting type, the hydraulic motors being referred to by the reference numerals 12, 14, 16 and 18. The hydraulic motors 12 and 14 have first ends thereof connected together by a hydraulic line 20, to which there is connected a hydraulic line 22 which will be referred to as a first hydraulic line. The hydraulic motors 16 and 18 have first ends thereof connected together by a hydraulic line 24 which is connected to the first hydraulic line 22 by means of the hydraulic line 26.

The hydraulic system 10 includes a conventional type of four-way valve 28, to which there is connected the first hydraulic line 22. Also connected to the four-way valve 28 is a hydraulic supply line 30, a return line 32 and a second hydraulic line 34. It is to be understood that the connection to the four-way valve 28 is such that the first hydraulic line 22 may be selectively connected to either the hydraulic supply line 30 or the return line 32, at which time the second hydraulic line 34 will be connected to the opposite of the last two mentioned hydraulic lines.

The hydraulic system 10 also includes a control valve which is referred to in general by the reference numeral 36. The control valve 36 has connected thereto at one side thereof the second hydraulic line 34. Connected to the opposite side of the control valve 36 are lines 38, 40, 42 and 44, which are connected to second ends of the hydraulic motors 12, 14, 16 and 18, respectively.

Referring now to Figures 2, 3 and 4 in particular, it will be seen that the control valve 36 includes a valve housing 46 which is elongated and which has a longitudinal bore 48 extending the length thereof. Extending transversely of the bore 48 and located somewhat centrally of the housing 46 is a chamber 50 which has communicated therewith a fluid passage 52 receiving the second hydraulic line 34. Disposed intermediate the chamber 50 and the bore 48 is a baffle 54 so as to provide two longitudinally spaced flow passages 56 and 58 between the chamber 50 and the bore 48.

The valve housing 46 is provided with four longitudinally spaced flow passages 60, 62, 64 and 66 which correspond to the hydraulic lines 38, 40, 42 and 44, respectively. The flow passages 60, 62, 64 and 66 all communicate with the bore 48 with the flow passages 60 and 62 having reduced entrance openings 68 and 70, respectively, disposed longitudinally on opposite sides of the flow passage 56. The flow passages 64 and 66 have reduced entrance openings 72 and 74, respectively, which are longitudinally on opposite sides of the flow passage 58.

Slidably disposed within the bore 48 is a valve member which is referred to in general by the reference numeral 76. The valve member 76 is provided with an elongated valve stem 78 which is connected to an intermediate portion 80 by a reduced portion 82. The reduced portion 82 permits the flow of fluid through the bore 48 transversely thereof. The valve member 76 also includes an end portion 84 which is connected to the intermediate portion 80 by a reduced portion 86. Like the reduced portion 82, the reduced portion 86 permits the flow of fluid transversely through the bore 48.

The valve member 76 is shown in an initial position in Figure 2. When in this position, the flow passage 64 is communicated with the flow passage 52 through the flow passage 58. When the valve member 76 is shifted slightly to the right, the flow passage 66 becomes communicated with the flow passage 52 through the flow passage 58. When either the flow passage 64 or the flow passage 66 is communicated with the flow passage 52, the intermediate portion 80 of the valve member 76 serves to close the flow passages 56, 68 and 70.

When the valve member 76 is further shifted to the right, as viewed in Figures 2 and 3, the reduced portion 86 becomes aligned with the flow passage 60 to communicate the flow passage 60 with the flow passage 52 through the flow passage 56. Further movement of the valve member 76 to the right results in the flow passage 62 being communicated with the flow passage 52 through the flow passage 56. When the flow passages 60 and 62 are communicated with the flow passage 52, the intermediate portion 80 serves to close the flow passages 58, 64 and 66.

In order that the valve member 76 may be restrained against movement from a selected position, there is provided on the housing 46 an upstanding boss 88 which is provided with a bore 90 extending therethrough, the bore 90 communicating with the bore 48. The bore 90 is provided with an enlarged, internally threaded outer portion 92 in which there is threadedly engaged an adjusting screw 94. The adjusting screw 94 is provided with a lock nut 96. Disposed in the lower end of the bore 90 is a detent 98 which is spring urged downwardly by a spring 100 disposed in the upper part of the bore 90 and bearing against the screw 94 and the detent 98.

The valve stem 78 is provided with a plurality of longitudinally spaced sockets 102, 104, 106 and 108 which are wedge-shaped in cross section and which correspond to the cross section of a lower point 110 of the detent 98. The sockets 102, 104, 106 and 108 correspond to the flow passages 64, 66, 60 and 62, respectively.

It is to be noted that the right-hand end of the bore 48, as viewed in Figures 2 and 3, is closed by a fitting 112 screw threaded in the housing 46. The fitting 112 is provided with a reduced opening 114 for the passage of hydraulic fluid into the right end of the bore 48. Connected to the fitting 112 is a hydraulic line 116, whose opposite end is connected to the first hydraulic line 22 and it is also to be noted that the end of the valve member 76 opposing the fitting 112 is in the form of a piston.

The left-hand end of the bore 48 is provided with an enlargement 118. The enlarged portion of the bore 48 is closed by a plug 120 screw threaded into the housing 46.

The enlarged bore portion 118 is communicated with the chamber 50 by means of a tube 122. In order to restrict the flow of hydraulic fluid into the bore portion 118, there is provided a reduced opening 124. It is to be understood that the left-hand end of the valve member 76 also functions as a piston.

In describing the operation of the hydraulic system 10, it must be assumed that the hydraulic motors 12, 14, 16 and 18 are in their retracted positions and are to be extended. The four-way valve 28 is then operated to communicate the second hydraulic line 34 with the hydraulic supply line 30. Hydraulic fluid then enters into the control valve 36, and with the valve member 76 in the position illustrated in Figure 2, hydraulic fluid is supplied to the hydraulic motor 16. After the hydraulic motor 16 has become extended, there is a pressure build-up in the second hydraulic line 34. This results in a pressure build-up on the left-half end of the valve member 76, and as a result the valve member 76 is urged to the right. Inasmuch as the flow of hydraulic fluid into the enlarged portion 118 of the bore 48 is slow, the movement of the valve member 76 will be relatively slow, and as soon as the reduced portion 82 is aligned with the reduced inlet 74 of the flow passage 66, flow will begin through the flow passage 66 to the hydraulic motor 18 and the pressure on the left-hand end of the valve member 76 will diminish. At this time, the detent 98 will seat in the socket 104 and hold the valve member 76 in its next position. The operation of the control valve 36 will be automatic until such time as all of the hydraulic motors 12, 14, 16 and 18 have been extended.

When it is desired to retract the hydraulic motors 12, 14, 16 and 18, the four-way valve 28 will be shifted to a position communicating the first hydraulic line 22 with the hydraulic supply line 30. At this time, the hydraulic motor 14 will be first actuated, and once it has reached the retracted position, there will be a pressure build-up in the hydraulic line 116, with the resultant pressure build-up on the right-hand end of the valve member 76 so as to effect sequential shifting thereof to the left so that all the hydraulic motors 12, 14, 16 and 18 will be progressively retracted.

Referring now to Figure 5, in particular, it will be seen that there is illustrated a modified form of hydraulic system which is referred to in general by the reference numeral 126. The hydraulic system 126 includes a hydraulic supply line 128 and a return line 130 which are connected to a four-way valve 132. Also connected to the four-way valve 132 is a first hydraulic line 134 and a second hydraulic line 136.

The hydraulic system 126 includes two hydraulic motors 138 and 140. First ends of the hydraulic motors 138 and 140 are connected together by hydraulic line 142, to which there is connected the first hydraulic line 134.

In order to control the operation of the hydraulic motors 138 and 140 for progressive or sequential action, there is provided a control valve which is referred to in general by the reference numeral 144. The control valve 144 is very similar to the control valve 36 and differs therefrom primarily in that it controls two hydraulic motors only. The control valve 144 includes a housing 146 having a longitudinal bore 148 which extends the length thereof. Slidably mounted in the bore 148 is a valve member 150. The right-hand end of the bore 148 is closed by a fitting 152, to which there is connected a hydraulic line 154 whose opposite end is connected to the first hydraulic line 134. The opposite end of the bore 148 is in the form of an enlarged chamber 156 which is closed remote from the valve member 150 by a fitting 158. Connected to the fitting 158 is the second hydraulic line 136.

The upper part of the housing 146 is provided with an arcuate flow passage 160 which communicates the chamber 156 with the intermediate portion of the bore 148. The lower part of the housing 146 is provided with a flow passage 162 which has a portion adjacent the bore 148 aligned with the flow passage 160 so that the flow passages 160 and 162 may be selectively communicated.

The lower portion of the housing 146 also includes a flow passage 164 which has a reduced upper portion thereof communicated with the bore 148 in longitudinally spaced relation with respect to the flow passage 160. Connected to the flow passages 162 and 164 are hydraulic lines 166 and 168 which are connected to second ends of the hydraulic motors 138 and 140, respectively.

The valve member 150 is elongated and is formed at the right end thereof with a piston 170. The left end of the valve member 150 is in the form of a piston 172. The valve member 150 includes a reduced intermediate portion 174. The right end of the valve member 150 is in the form of a valve stem 176 which has a pair of sockets 178 and 180 formed in the upper part thereof.

It is to be noted that when the valve member 150 is in the position illustrated in Figure 5, the reduced portion 174 is aligned with the flow passages 160 and 162 to communicate the two. On the other hand, when the valve member 150 is shifted to the right, that portion of the bore 148 between the flow passages 160 and 162 will become closed and flow will be between the flow passage 164 and the chamber 156.

In order that the valve member 150 may be retained in a selected one of the two above mentioned positions, there is provided on the housing 146 an upstanding boss 182 which includes a bore 184 having an enlarged, internally threaded upper portion 186. Disposed in the lower portion of the bore 184 is a detent 188 having a wedge-shaped lower end 190 which is complementary to the shape of the sockets 178 and 180. The detent 188 is spring urged downwardly by a spring 192 disposed in the upper part of the bore 184 and which is adjustably urged downwardly by a screw 194 threadedly engaged in the upper portion 186 and retained in an adjusted position by a lock nut 196.

The operation of the hydraulic system 126 will be identical with the operation of the hydraulic system 10, with the exception of the fact that only two hydraulic motors are actuated. The valve member 150 will be shifted to the left by pressure on the piston 170 with the pressure being supplied through the hydraulic line 154 and to the right by pressure on the piston 172 with pressure being applied in the chamber 156.

Referring now to Figure 6 in particular, it will be seen that there is illustrated a third hydraulic system which is referred to in general by the reference numeral 200. The third hydraulic system 200 includes a hydraulic supply line 202 which is connected to a hydraulic pump 204. The hydraulic pump 204 is in turn connected to a reservoir 206 by a line 208. A hydraulic return line 210 is connected to the tank 206.

The hydraulic system 200 also includes a first hydraulic line 212 and a second hydraulic line 214. The hydraulic lines 212 and 214 are selectively connected to the hydraulic supply line 202 and the return line 210 by a four-way valve 216.

The hydraulic system 200 also includes hydraulic motors 218 and 220 which are of the double acting type. First ends of the hydraulic motors 218 and 220 are connected together by hydraulic line 222 which in turn has connected thereto the first hydraulic line 212.

Actuation of the hydraulic motors 218 and 220 is controlled by a control valve which is referred to in general by the reference numeral 224. The control valve 224 includes a valve housing 226 having a bore 228 extending therethrough. Opposite ends of the bore 228 are closed by a plug 230 and a fitting 232. Disposed within the bore 228 is a valve member 234 having a valve stem 236 extending through the fitting 232 in sealed relation.

The housing 226 is provided with a flow passage 238 to which there is connected the second hydraulic line 214. The flow passage 238 is branched to provide separate flow passages 240 and 242 which communicate with the bore 228 in longitudinally spaced relation. Aligned with the flow passage 240 is a flow passage 244 which has connected thereto a hydraulic line 246 whose opposite end is connected to a second end of the hydraulic motor 218. Aligned with the flow passage 242 and communicated with the bore 228 is a flow passage 248 which has connected thereto a hydraulic line 250, which in turn is connected to the second end of the hydraulic motor 220.

It is to be noted that when the valve member 234 is in the position illustrated in Figure 6, the flow passages 238 and 244 are communicated so that the hydraulic motor 218 is operatively coupled in the hydraulic system 200. On the other hand, when the valve member 234 is shifted to the right, the flow passage 238 is communicated with the flow passage 248 to operatively connect the hydraulic motor 220 in the hydraulic system 200. Flow through the valve member 234 is facilitated by the valve member 234 being provided with a reduced intermediate portion 252.

In order that progressive actuation of the hydraulic motors 218 and 220 may be provided, there is provided a control motor 254 for the control valve 224. The control motor 254 includes a cylinder 256 which has positioned therein a double acting piston 258. Connected to the piston 258 is a piston rod 260 which extends through a fitting 262 closing one end of the cylinder 256. One end of the cylinder 256 is connected to the first hydraulic line 212 by a hydraulic line 264. The opposite end of the cylinder 256 is connected to the second hydraulic line 214 by a hydraulic line 266 which is connected to the fitting 262.

In order that the control motor 254 may operate the control valve 224, the housing 226 is provided with an extension 268 carrying a pivot pin 270. The pivot pin 270 passes through an intermediate portion of a lever 272. The lower end of the lever 272 is connected to the valve stem 236 by a pin 274 which is disposed in a slot 276 in the lower end of the lever 272. The piston rod 260 is provided with a pin 278 which is disposed in a slot 280 formed in the upper end of the lever 272. Thus, when the piston 258 moves to the left, the valve member 234 will be moved to the right. On the other hand, when the piston 258 is moved to the right, the valve member 234 will be shifted to the left. It is to be understood that the ratio of movement of the upper and lower ends of the lever 272 is such that when the piston 258 is at opposite ends of its travel, the reduced portion 252 of the valve member 234 will be properly aligned with the flow passages of the housing 226.

In order to retain the valve member 234 in a last selected position, there is provided an off-center spring 282. The upper end of the spring 282 is connected to the pin 278. The spring 282 has the lower end thereof anchored on a pin 284 which is suitably secured to a support 286. The several positions of the spring 282 clearly show the off-center relationship thereof so as to retain the valve member 234 in a last selected position.

It is to be understood that the operation of the hydraulic system 200 will be the same as that of the hydraulic system 126, with the only difference being that there is provided an external control motor in lieu of an integrally formed control motor. However, irrespective of the manner in which the control valve for the hydraluic motors 218 and 220 is actuated, the hydraulic motors 218 and 220 will operate progressively in the same manner as the hydraulic motors 138 and 140.

In the valve 224, if it is desired, the plugs 230 and the fitting 232 may be replaced by conventional O-rings and the valve stem 236 of the valve member 234 may be of a constant cross section at the ends thereof and pass entirely through the valve housing 226. By doing so, vacuum and pressures which will normally occur with the arrangement illustrated may be eliminated. However, it is to be understood, that the use of O-rings in lieu of the plug 230 and the fitting 232 is merely a matter of choice.

It is pointed out at this time that the valves, which are the subject of this invention, are intended to be used as substitutes for manually operated valves which are mounted on farm implements or industrial machinery which are now in use to control the operation of a plurality of hydraulic motors. The automatic control valves of this invention provide a more accurate timing, a quicker actuation, and a more foolproof operation than is possible by manual operation of several valves. The use of the automatic valve also frees the machine operator's mind and hands to perform other tasks. Further, the automatic valve reduces operator fatigue and thus serves to increase production.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hydraulic system comprising a hydraulic fluid supply line and a return line, first and second lines, a four-way valve disposed intermediate said supply line, said return line, and said first and second lines, a plurality of double acting hydraulic motors, said hydraulic motors each having a first and second end, said first line being connected to said first ends, a control valve, said second line being connected to said control valve, said control valve including a plurality of flow passages, there being one flow passage for each hydraulic motor, third lines connecting said flow passages with said second ends, said control valve including a shiftable valve member for selectively individually communicating said flow passages with said second line, shift means for automatically shifting said valve member in response to pressure differentials in said first and second lines.

2. A hydraulic system comprising a hydraulic fluid supply line and a return line, first and second lines, a four-way valve disposed intermediate said supply line, said return line, and said first and second lines, a plurality of double acting hydraulic motors, said hydraulic motors each having a first and second end, said first line being connected to said first ends, a control valve, said second line being connected to said control valve, said control valve including a plurality of flow passages, there being one flow passage for each hydraulic motor, third lines connecting said flow passages with said second ends, said control valve including a shiftable valve member for selectively individually communicating said flow passages with said second line, shift means for automatically shifting said valve member in response to pressure differentials in said first and second lines, said shift means being hydraulcially actuated, said first and second lines being connected to said shift means.

3. A hydraulic system comprising a hydraulic fluid supply line and a return line, first and second lines, a four-way valve disposed intermediate said supply line, said return line, and said first and second lines, a plurality of double acting hydraulic motors, said hydraulic motors each having a first and second end, said first line being connected to said first ends, a control valve, said second line being connected to said control valve, said control valve including a plurality of flow passages, there being one flow passage for each hydraulic motor, third lines connecting said flow passages with said second ends, said control valve including a shiftable valve member for selectively individually communicating said flow passages with said second lines, shift means for automatically shifting said valve member in response to pressure differentials in said first and second lines, overridable retaining means retaining said valve member in a last shifted position.

4. A hydraulic system comprising a hydraulic fluid supply line and a return line, first and second lines, a four-way valve disposed intermediate said supply line, said return line, and said first and second lines, a plurality of double acting hydraulic motors, said hydraulic motors each having a first and second end, said first line being connected to said first ends, a control valve, said second line being connected to said control valve, said control valve including a plurality of flow passages, these being a flow passage for each hydraulic motor, third lines connecting said flow passages with said second ends, said control valve including a shiftable valve member for selectively individually communicating said flow passages with said second line, shift means for automatically shifting said valve member in response to pressure differentials in said first and second lines, overridable retaining means retaining said valve member in a last shifted position, said retaining means including spring urged detents.

5. A hydraulic system comprising a hydraulic fluid supply line and a return line, first and second lines, a four-way valve disposed intermediate said supply line, said return line, and said first and second lines, a plurality of double acting hydraulic motors, said hydraulic motors each having a first and second end, said first line being connected to said first ends, a control valve, said second line being connected to said control valve, said control valve including a plurality of flow passages, there being one flow passage for each hydraulic motor, third lines connecting said flow passages with said second ends, said control valve including a shiftable valve member for selectively individually communicating said flow passages with said second line, shift means for automatically shifting said valve member in response to pressure differentials in said first and second lines, overridable retaining means retaining said valve member in a last shifted position, said retaining means including spring urged detents, said valve member including a stem, a socket in said stem for each flow passage, said sockets being selectively alignable with said detent.

6. A hydraulic system comprising a hydraulic fluid supply line and a return line, first and second lines, a four-way valve disposed intermediate said supply line, said return line, and said first and second lines, a plurality of double acting hydraulic motors, said hydraulic motors each having a first and second end, said first line being connected to said first ends, a control valve, said second line being connected to said control valve, said control valve including a plurality of flow passages, there being one flow passage for each hydraulic motor, third lines connecting said flow passages with said second ends, said control valve including a shiftable valve member for selectively individually communicating said flow passages with said second line, shift means for automatically shifting said valve member in response to pressure differentials in said first and second lines, overridable retaining means retaining said valve member in a last shifted position, said retaining means including spring urged detents, said valve member including a stem, a socket in said stem for each flow passage, said sockets being selectively alignable with said detent, said socket being wedge-shaped, said detent having a complementary shaped end.

7. A hydraulic system comprising a hydraulic fluid supply line and a return line, first and second lines, a four-way valve disposed intermediate said supply line, said return line, and said first and second lines, a plurality of double acting hydraulic motors, said hydraulic motors each having a first and second end, said first line being connected to said first ends, a control valve, said second line being connected to said control valve, said control valve including a plurality of flow passages, there being one flow passage for each hydraulic motor, third lines connecting said flow passages with said second ends, said control valve including a shiftable valve member for selectively individually communicating said flow passages with said second line, shift means for automatically shifting said valve member in response to pressure differentials in said first and second lines, said shift means being hydraulically actuated, said first and second lines being connected to said shift means, overridable retaining means retaining said valve member in a last shifted position.

8. A hydraulic system comprising a hydraulic fluid supply line and a return line, first and second lines, a four-way valve disposed intermediate said supply line, said return line, and said first and second lines, a plurality of double acting hydraulic motors, said hydraulic motors each having a first and second end, said first line being connected to said first ends, a control valve, said second line being connected to said control valve, said control valve including a plurality of flow passages, there being one flow passage for each hydraulic motor, third lines connecting said flow passages with said second ends, said control valve including a shiftable valve member for selectively individually communicating said flow passages with said second line, shift means for automatically shifting said valve member in response to pressure differentials in said first and second lines, said shift means being incorporated in said control valve.

9. A hydraulic system comprising a hydraulic fluid supply line and a return line, first and second lines, a four-way valve disposed intermediate said supply line, said return line, and said first and second lines, a plurality of double acting hydraulic motors, said hydraulic motors each having a first and second end, said first line being connected to said first ends, a control valve, said second line being connected to said control valve, said control valve including a plurality of flow passages, there being one flow passage for each hydraulic motor, third lines connecting said flow passages with said second ends, said control valve including a shiftable valve member for selectively individually communicating said flow passages with said second line, shift means for automatically shifting said valve member in response to pressure differentials in said first and second lines, said shift means being incorporated in said control valve, opposite ends of said valve member being in the form of pistons.

References Cited in the file of this patent

UNITED STATES PATENTS

| | | |
|---|---|---|
| 2,197,428 | Erb | Apr. 16, 1940 |
| 2,259,768 | Naylor et al. | Oct. 21, 1941 |